(12) United States Patent
Cai et al.

(10) Patent No.: US 6,721,318 B1
(45) Date of Patent: Apr. 13, 2004

(54) EXTENDING ROUTER FUNCTIONALITY TO REPORT STATIC GROUP MEMBERSHIP

(75) Inventors: Xiangrong Cai, Billerica, MA (US); Shuching Shieh, Nashua, NH (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/363,610

(22) Filed: Jul. 29, 1999

(51) Int. Cl.[7] .............................................. H04L 12/56
(52) U.S. Cl. ....................... 370/390; 370/432; 709/222
(58) Field of Search ................................ 370/390, 400, 370/432, 355, 401; 709/242, 222; 713/163

(56) References Cited

U.S. PATENT DOCUMENTS

| | | | |
|---|---|---|---|
| 6,169,741 B1 * | 1/2001 | LeMaire et al. | 370/401 |
| 6,266,339 B1 * | 7/2001 | Donahue et al. | 370/432 |
| 6,331,983 B1 * | 12/2001 | Haggerty et al. | 370/400 |
| 6,483,832 B1 * | 11/2002 | Civanlar et al. | 370/390 |
| 6,631,420 B1 * | 10/2003 | Li et al. | 709/242 |

* cited by examiner

*Primary Examiner*—Hassan Kizou
*Assistant Examiner*—John Pezzlo
(74) *Attorney, Agent, or Firm*—Fish & Richardson P.C.

(57) ABSTRACT

A router is configured with a static membership to a multicast group address and is capable of transmitting a message reporting the static membership to another router.

29 Claims, 7 Drawing Sheets

EXTENDING ROUTER FUNCTIONALITY TO REPORT STATIC GROUP MEMBERSHIP

BACKGROUND

This invention relates to multicast routing.

Multicast routing enables a host to transmit a stream of data packets to a group of hosts on a wide area network (WAN). Each multicast data packet has a multicast group address, which functions like a radio channel. Hosts tune into the multicast packet by joining the associated multicast group address. While a host belongs to the multicast group, the host receives each data packet transmitted to the multicast group address.

A multicast router records memberships to multicast group addresses by hosts of the local area network (LAN's) to which the multicast router connects. From these memberships, a multicast router determines whether to transmit received multicast packets to LAN's to which the router connects.

A multicast router may dynamically update memberships so that hosts can join and quit multicast group addresses. Dynamically updating enables hosts to tune in and out of multicast data traffic.

The Internet Group Management Protocol (IGMP) provides one process for dynamically updating memberships to multicast group addresses. The IGMP process entails making regular queries to LAN hosts supporting the IGMP protocol. An IGMP querying router queries a LAN to which it connects at regular intervals, e.g., once a minute. In response to a query, an IGMP host transmits one or more messages reporting its memberships to multicast group addresses.

The routing algorithm determines the detailed routing of multicast data packets. One routing algorithm uses the link state routing protocol. To perform the link state routing protocol, routers regularly collect delay or cost data for sending packets to adjacent routers. From the collected data, the routers construct packets with local routing data. The local routing data includes memberships to multicast group addresses. The routers flood the packet with the local routing data to other routers of the network. To implement flooding, each router transmits an incoming packet to every outgoing line of the router except the line on which the packet arrived. The routers receive similar packets from the other routers and use the received packets to calculate future routings for data packets, e.g., multicast data packets.

Routing protocols use hierarchical organization to improve performance of the link state routing algorithm on large networks. One such routing protocol is the open shortest path first (OSPF) protocol. In the OSPF protocol, a special set of routers, i.e., designated routers (DR), collect and disseminate the local routing data to the OSPF routers. Limiting these activities to DR routers reduces network traffic and calculations for determining future routings.

SUMMARY

In a first aspect, the invention provides an apparatus. The apparatus includes a router configured with a static membership to a multicast group address. The router is capable of transmitting a message reporting the static membership to another router.

In a second aspect, the invention provides a method of propagating memberships to multicast group addresses. The method includes transmitting a message reporting one or more static memberships to multicast group addresses. The message is transmitted from a first multicast router configured with the one or more static memberships to a second multicast router.

Various embodiments propagate memberships to multicast group addresses of statically configured routers. Corresponding multicast data packet traffic is received by local area networks connected to such routers.

BRIEF DESCRIPTION OF THE DRAWINGS

Other objects, features, and advantages of the invention will be apparent from the following description, taken together with the drawings in which.

DESCRIPTION

Figure 1:
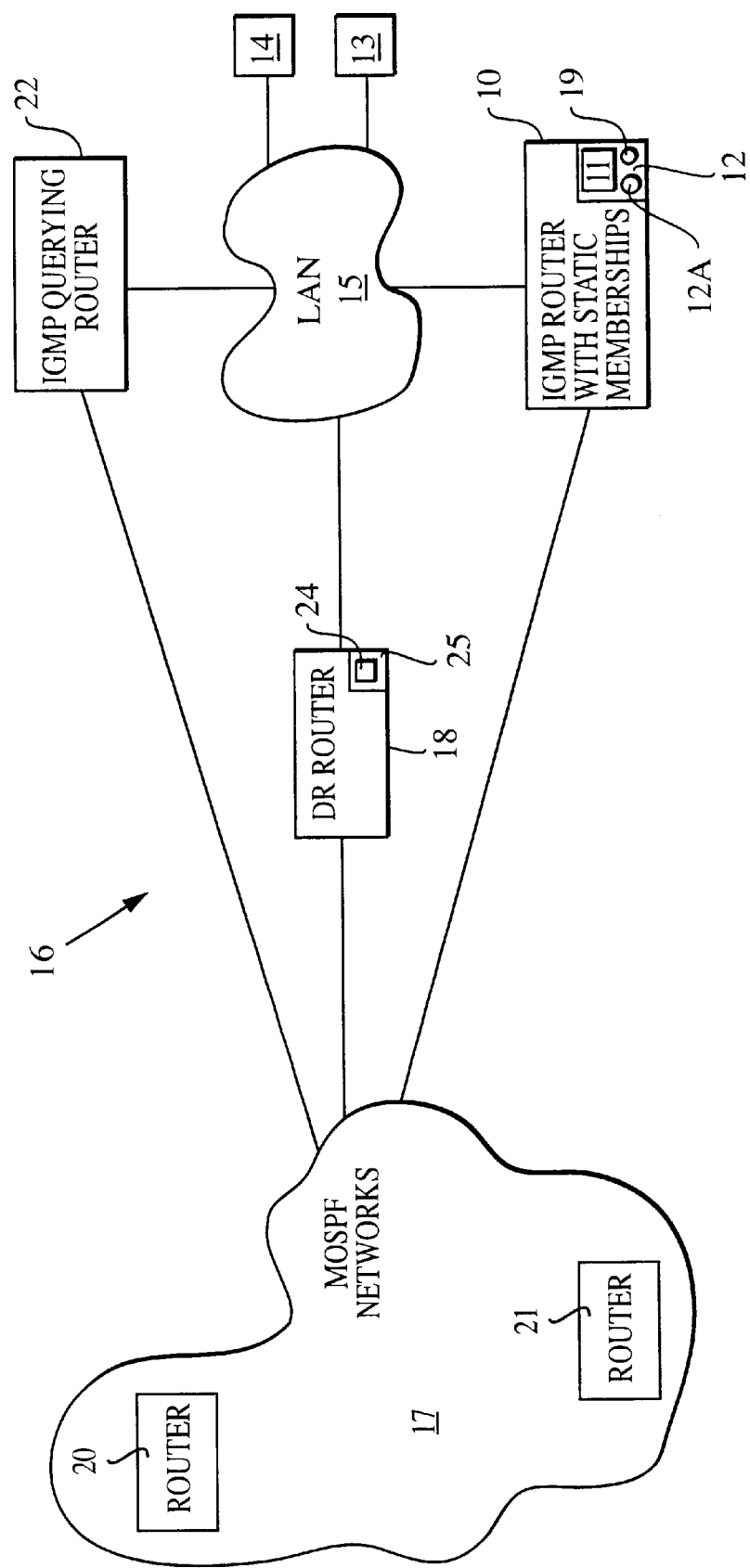
FIG. 1 shows an IGMP router configured with a static membership to one or more multicast group addresses.

Referring to FIG. 1, a multicast OSPF (MOSPF) router 10 configured with one or more static memberships to multicast group addresses is shown. The static memberships are entries of a table 11 stored in a memory storage device 12. The memory storage device 12 also stores an executable process 12a for responding to IGMP protocol messages. The MOSPF router 10 responds to IGMP query messages like IGMP hosts 13, 14.

The MOSPF router 10 connects to a LAN 15 that belongs to a wide area network (WAN) 16. The WAN 16 includes an MOSPF designated (DR) router 18 that is responsible for propagating memberships to multicast group addresses for the LAN 15 to other MOSPF networks 17. The MOSPF DR router 18 propagates local routing data on the LAN 15 by regularly flooding routing data to MOSPF routers 20, 21 connected to the other MOSPF networks 17. The flooded routing data includes the memberships to multicast group addresses for the LAN 15 that are known to the MOSPF DR router 18.

The LAN 15 also connects to an IGMP multicast router 22 that also supports the MOSPF protocol. The IGMP router 22 performs IGMP querying for memberships to multicast group addresses of the LAN 15. The IGMP router 22 may be the IGMP querier that resulted from an arbitration between routers having IGMP interfaces with the LAN 15, e.g., based on Internet Protocol (IP) addresses. Thus, the identity of the IGMP querying router may be unknown before the routers are installed in the WAN 16. The IGMP querying router 22 dynamically determines memberships to multicast group address of the LAN 15.

The MOSPF DR router 18 propagates data on memberships to multicast group addresses, which are known to itself, to the other MOSPF networks 17. The data on memberships is propagated to all MOSPF routers 20, 21. To ensure propagation of the memberships of the LAN 15, the MOSPF DR router 18 is informed of the memberships of both hosts 13, 14 and of the router 10. The propagation of data on those memberships ensures that the LAN 15 will receive the associated streams of multicast data packets through its MOSPF routers 10, 18, 22.

Figure 2A:
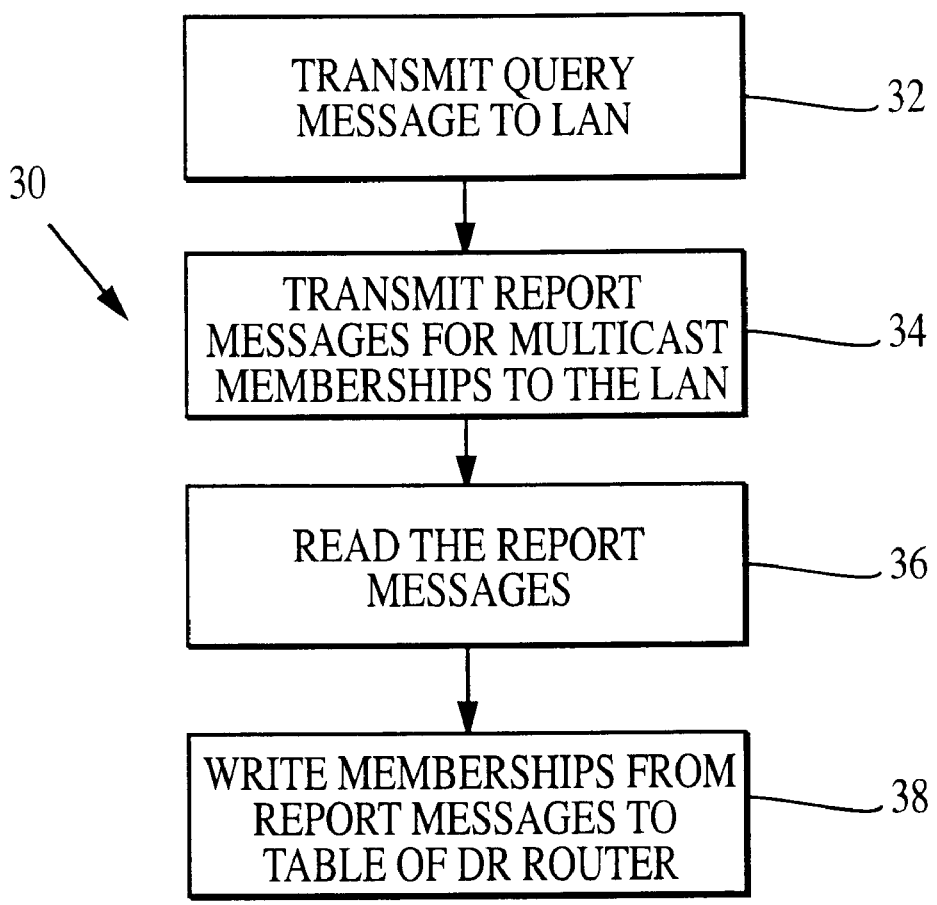
FIGS. 2A–2C show processes for determining and propagating multicast memberships of a LAN.

Referring to FIG. 2A, a process 30 to dynamically propagate memberships to multicast group addresses of the LAN 15 of FIG. 1 is shown. The IGMP router 22 transmits 32 an IGMP query message to the LAN. The query message is a multicast message for either a general query or a specific query of memberships to multicast group addresses, e.g., IP multicast addresses. The hosts 13, 14, whose processes request membership to the multicast group addresses, transmit 34 IGMP multicast messages to the LAN. Each IGMP message reports one of the multicast group addresses to which the transmitting host 13, 14 requests membership. Both, the IGMP querying and MOSPF DR routers 22, 18 monitor for the IGMP messages reporting multicast memberships, because both routers 18, 22 are multicast routers connected to the LAN 15. The MOSPF DR router 18 reads 36 the IGMP messages from the hosts 13, 14 that report memberships to multicast group addresses. The MOSPF DR router 18 writes 38 membership data obtained from the IGMP messages reporting memberships to a table 24 of an internal memory storage device 25.

Figure 2B:
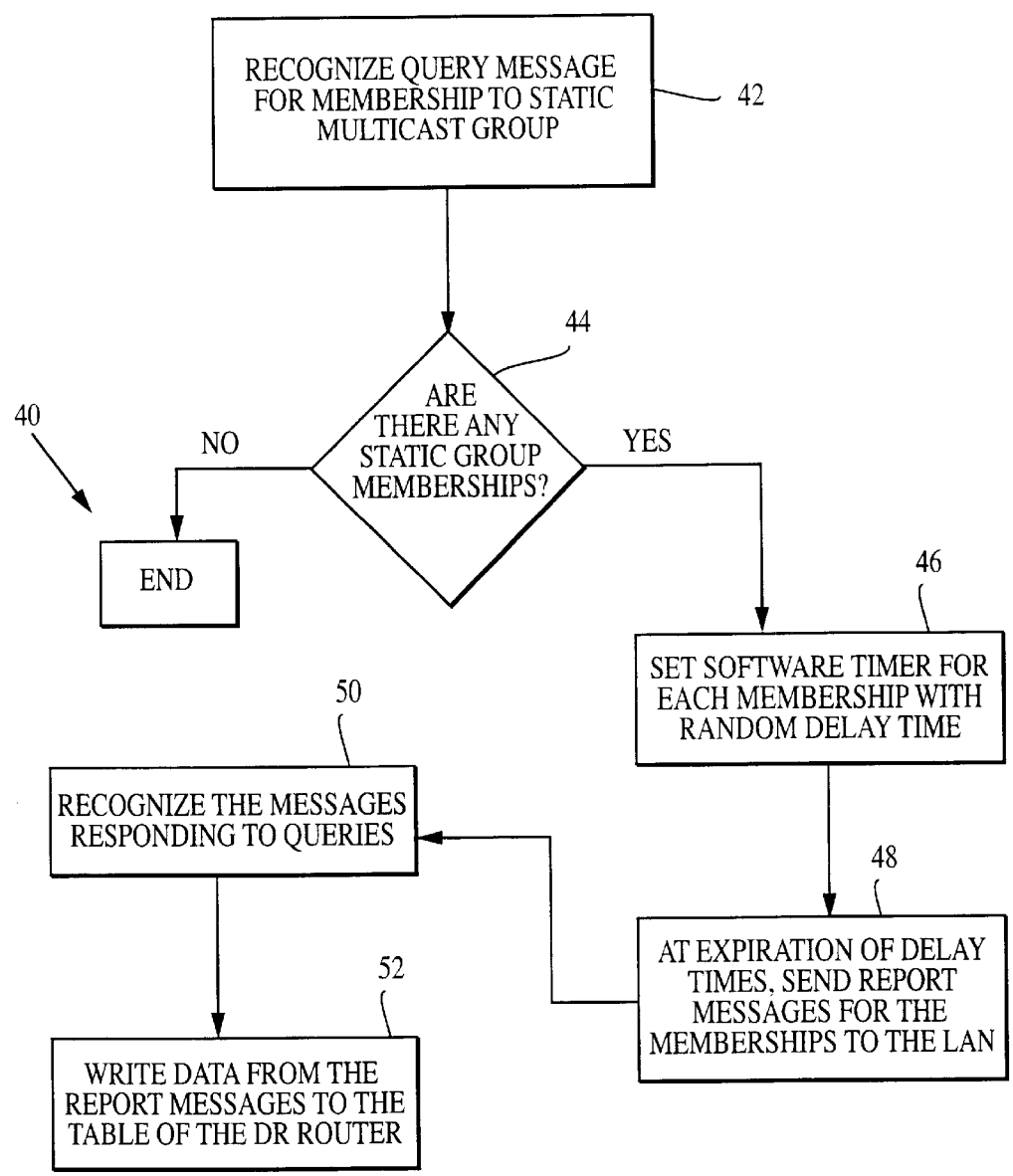

Referring to FIG. 2B, a process 40 by which the MOSPF router 10 with a static membership responds to the query message from the IGMP querying router 22 is shown. Since the MOSPF router 10 supports the IGMP protocol, the MOSPF router 10 recognizes 42 the IGMP query on the LAN 15. In response to the query, the MOSPF router 10 determines 44 whether there are static memberships to multicast group addresses. Since static memberships are recorded in the table 11, determining 44 can include a lookup in the table 11. If no static memberships are found, the MOSPF router 10 ignores the IGMP query message. If a static membership found, the MOSPF router 10 starts 46 a countdown of a random delay time on a software timer 19 for each static membership. Each random delay time is less than a preselected maximum time. At the expiration of each random time, the router 10 sends 48 an IGMP multicast message reporting the associated static membership to the LAN 15. By waiting for random number delay times prior to responding, unnecessary IGMP messages reporting memberships to multicast groups, i.e., duplicates, are surpressed. The MOSPF router 10 monitors for messages from the hosts 13, 14, which report memberships, and stops a timer and ignores the corresponding static membership in response to observing the same membership in a message from one of the hosts 13, 14. Since the MOSPF DR router 18 monitors for multicast messages, the MOSPF DR router 18 recognizes 50 the IGMP messages reporting memberships that originate from the MOSPF router 10. The MOSPF DR router 18 writes 52 memberships reported in the messages to the table 24 in the memory storage device 25. These memberships may include static memberships.

Figure 2C:
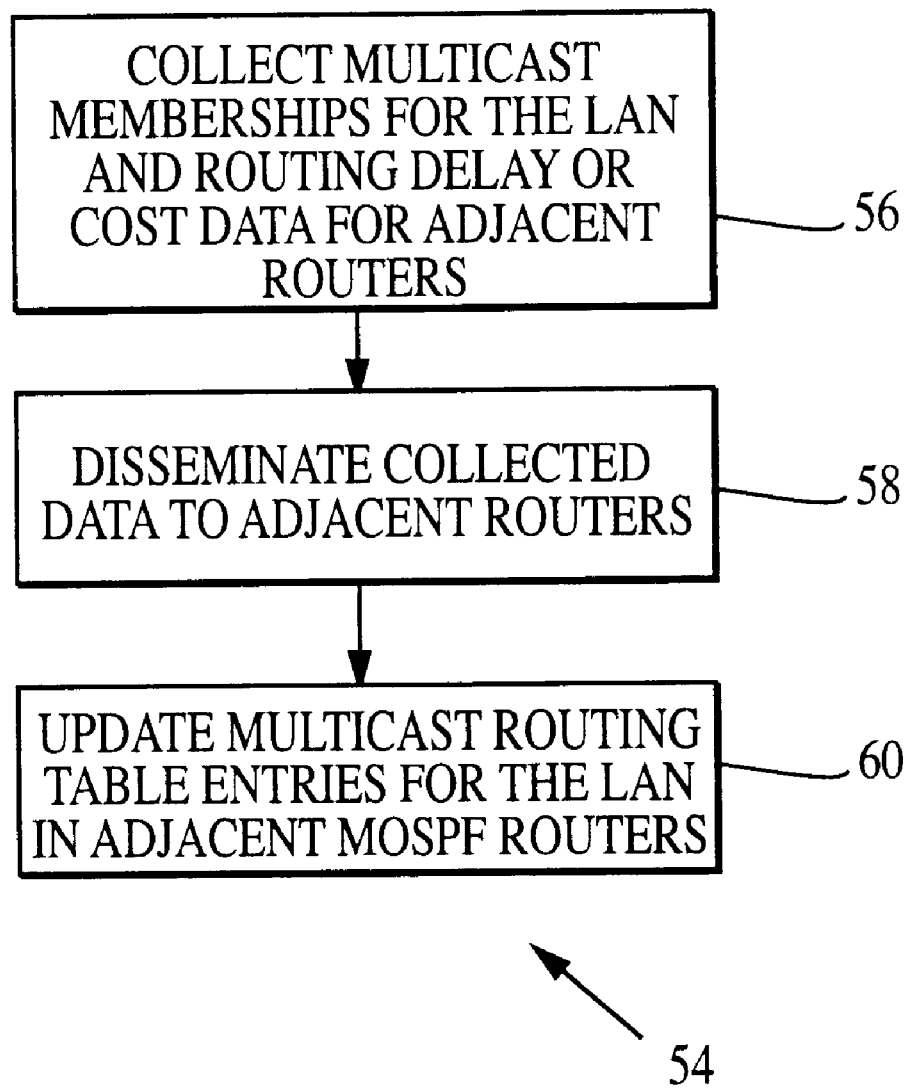

Referring to FIG. 2C, a process 54 for propagating multicast memberships from the LAN 15 to the other MOSPF networks 17 is shown. The MOSPF DR router 18 monitors 56 the LAN 15 to collect multicast membership data and collects cost or delay data for routing messages to adjacent MOSPF routers 20, 21. At the end of a predetermined interval, the MOSPF DR router 18 disseminates 58, e.g., by flooding, packets with the collected data to the other MOSPF routers 20, 21 of the MOSPF networks 17. The adjacent MOSPF routers 20, 21 update 60 entries for the MOSPF DR router 18 in their own multicast routing tables using the flooded data.

Referring again to FIG. 1, the MOSPF router 10 with the static membership to multicast group addresses may send an initial unsolicited IGMP message reporting multicast memberships in response to booting up. Such a message communicates static memberships without the unknown delay associated with waiting for the next IGMP query for messages reporting multicast memberships of the LAN 15. These initial messages may be repeated once or twice to reduce the risk that the messages were not received.

Since conventional routers do not respond to IGMP queries, their static memberships to multicast groups are not communicated to MOSPF DR routers connected to the same LAN. Unless a host of the same LAN has a membership to the same multicast group address, other MOSPF routers cannot learn of the static memberships and will not route multicast packet traffic to the multicast routers of a LAN based on such memberships.

Conventional flood and prune routing protocols, such as DVMRP, do not need to propagate memberships to multicast group addresses between routers. Instead, routers running these multicast routing protocols decide whether to prune themselves from received multicast streams of data packet based on their own multicast memberships. With such protocols, multicast data packets would flow into LAN's based on non-propagating static memberships. But, flood and prune protocols have disadvantages not encountered in the MOSPF routing protocol.

Figure 3:
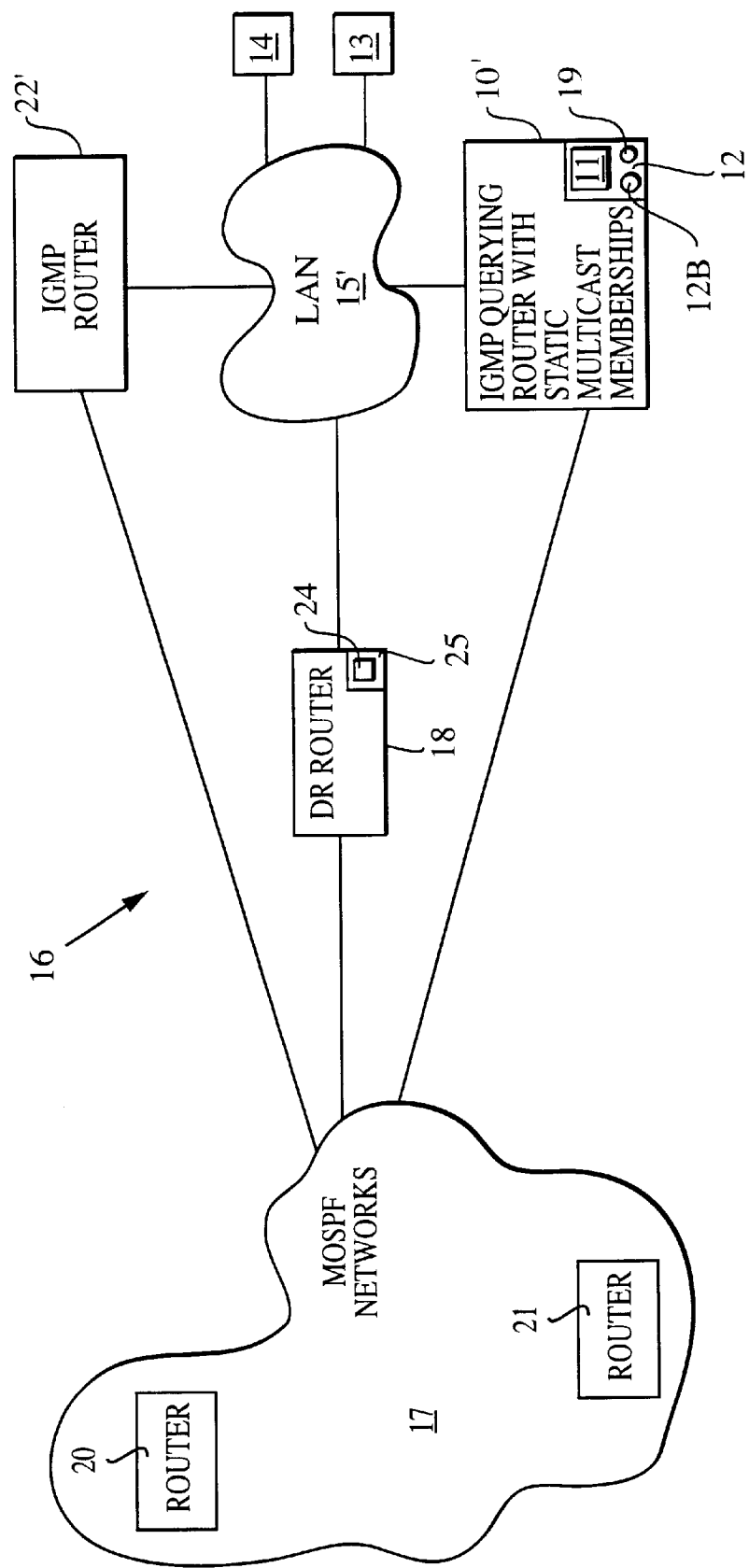
FIG. 3 shows a IGMP querying router configured with one or more static memberships to multicast group addresses.

Referring to FIG. 3, an IGMP router 10' having a static membership to one or more multicast group addresses is shown. The IGMP router 10' is also the IGMP querying for the LAN 15. The querying router of the LAN 15 is determined by an arbitration based on IP address. The querying router 10' has a higher IP address than the other IGMP routers 18, 22 connected to the LAN 15.

The MOSPF DR router 18 propagates multicast memberships of the LAN 15 to the other MOSPF routers 20, 21 of a WAN 16'. Since the other routers 10', 22 are not DR routers, these routers 10', 22 do not propagate such memberships. Thus, propagating the multicast memberships through the MOSPF DR router 18 enables all the MOSPF routers 10', 18, 22 of the LAN 15 to receive streams of multicast packets from the other MOSPF networks 17.

The router 10' stores executable software 12*b* for the IGMP protocol in the memory storage device 12. The software 12*b* supports an IGMP querying process that announces static memberships to multicast group addresses from the table 11 known to the MOSPF DR router 18.

Figure 4:
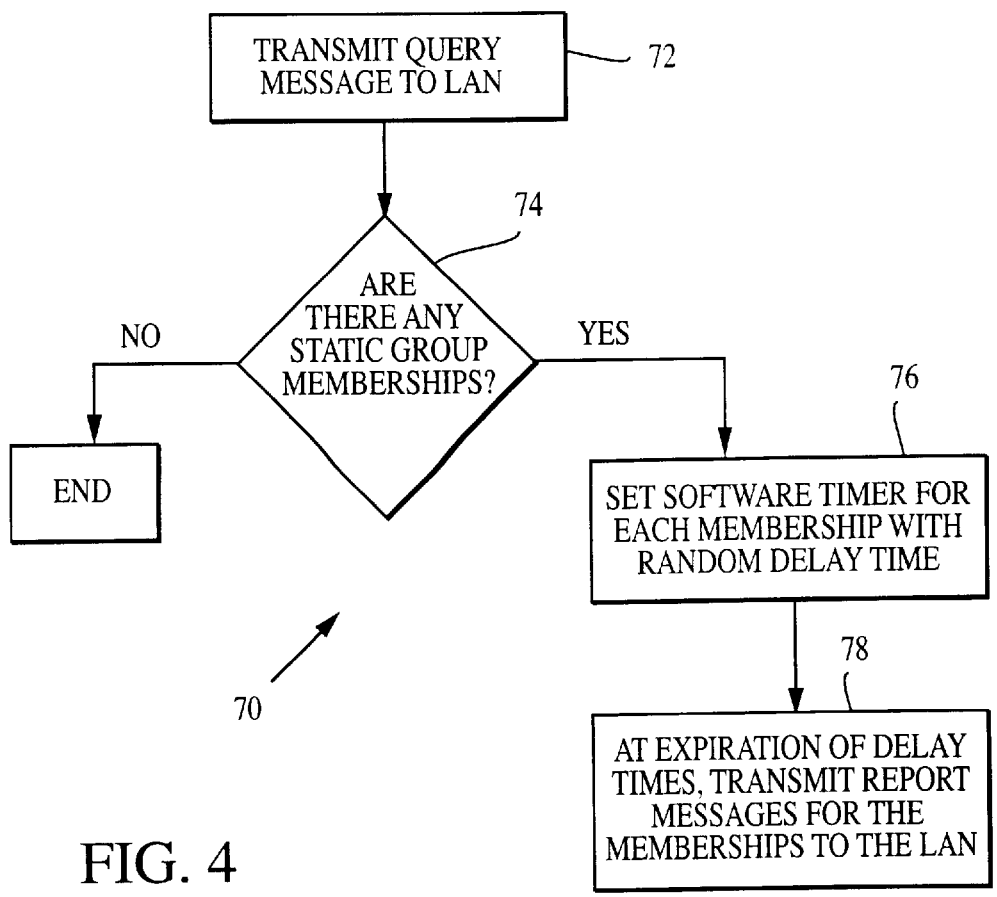
FIG. 4 shows a process for querying multicast memberships of a LAN shown in FIG. 3.

Referring to FIG. 4 a process 70 by which the IGMP router 10' queries memberships of the LAN 15' to multicast group addresses is shown. The IGMP querying router 10' transmits 72 an IGMP query message to the LAN 15'. In response to receiving the query message, the hosts 13, 14 transmit IGMP messages to the LAN 15'. These IGMP messages report the host memberships to multicast group addresses, e.g., IP multicast addresses.

Lower level protocols ensure that the IGMP querying router 10' does not receive its own query message. Thus, the IGMP querying router 10' automatically communicates its own static multicast memberships in response to transmitting the IGMP query message. The IGMP querying router 10' checks whether the internal table 11 records 74 any static memberships to multicast group addresses. For each static membership discovered, the IGMP querying router 10' starts 76 a separate software timer 19 to countdown a random delay time. Each delay time is less than a preselected upper bound. To avoid duplicates, the router 10' stops a timer 19 and ignores the corresponding static membership if the same membership, i.e., the same multicast group address, is identified in an IGMP message received from one of the hosts 13, 14. At the expiration of each delay time, the IGMP querying router 10' transmits 78 to the LAN 15' an IGMP message with a membership report in a fashion similar to that of the IGMP hosts 13, 14. These messages report the corresponding static memberships to multicast group addresses. The random transmission of the messages identifying static memberships reduces the probability that such messages will overload the bandwidth of the LAN 15'.

Conventional IGMP querying routers do not communicate internal static memberships to multicast group addresses to other devices connected to the same LAN. Thus, the static memberships of a conventional IGMP querying router would not be known by a MOSPF DR router connected to the same LAN and would not be propagated to other MOSPF networks unless other hosts on the same LAN communicate the same multicast memberships. This lack of communication of static memberships results in conventional IGMP querying routers not receiving multicast traffic addressed to the multicast group addresses of their internal static memberships.

Figure 5:
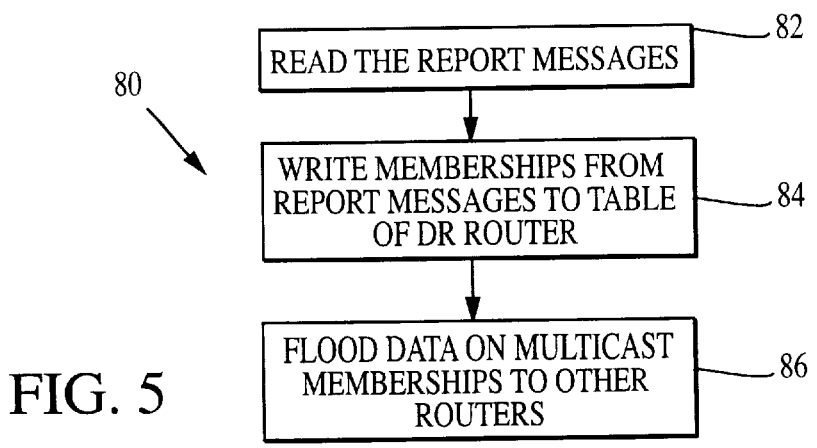
FIG. 5 shows a process for propagating multicast memberships of the LAN of FIG. 3.

Referring to FIG. 5, a process 80 by which the MOSPF DR router 18 propagates the memberships of the LAN 15' to multicast group addresses is shown. Since the MOSPF DR router 18 recognizes IGMP messages, the MOSPF DR router 18 reads 82 the IGMP messages on the LAN 15' that report multicast memberships. The read messages include messages reporting multicast memberships from both hosts 13, 14 and the IGMP querying router 10'. The MOSPF DR router 18 writes 84 multicast membership data obtained from the message reports in the table 24 located in the internal memory storage device 25. The MOSPF DR router 18 constructs a data packet having the data on multicast memberships, e.g., the associated IP multicast addresses, from the entries of the table 24 and disseminates, e.g., by flooding, the data packet to the other MOSPF routers 20, 21. The data from this data packet updates multicast routing data in the MOSPF routers 20, 21 so that multicast data packets from the MOSPF networks 17 can flow into the MOSPF routers 10', 18, 22' of the LAN 15'.

Figure 6:
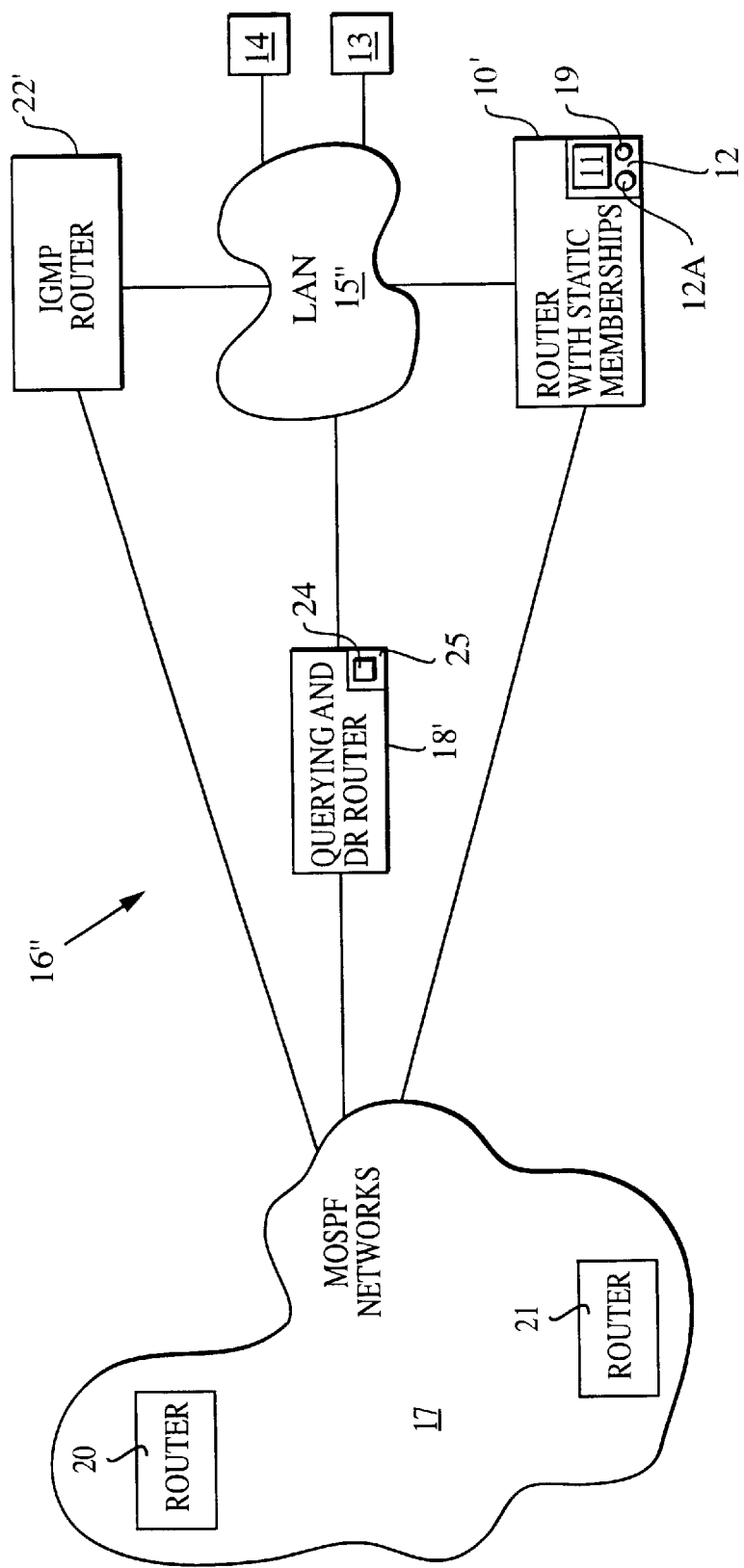
FIG. 6 shows a router which is both an IGMP querying router and a MOSPF DR router.

Referring to FIG. 6, a MOSPF router 18', which is both a DR router and the IGMP querying router for the LAN is", is shown. The selection of the router 18' as the IGMP querying router results from arbitration among routers 10', 22', 18' connected to the LAN 15".

The MOSPF DR router 18' obtains both static memberships of the router 10' and dynamic memberships of the hosts 13, 14 from the IGMP report messages responding to its own IGMP queries. The router 18' both performs the queries for determining multicast memberships, e.g., IP multicast addresses, of the LAN 15" and propagates data on the memberships to the other MOSPF networks 17 of WAN 16".

In some embodiments, routers have a memory device encoding executable processes to determine whether the routers are querying routers, MOSPF DR router, and/or configured with static multicast memberships. If the process determines that the associated router has a static membership but is not a querying router, the router behaves like the router 10 of FIG. 1. If the process determines that the associated router queries but is not a DR router and does not have static memberships, the router behaves like the router 22 of FIG. 1. If a process determines that the associated router is a querying router with a static membership, the router behaves like the router 10' of FIG. 3. If the process determines that the associated router is both a querying and a DR router, the router behaves like the router 18' of FIG. 6.

While the invention has been described in conjunction with the detailed description, the foregoing description is intended to illustrate and not to limit the scope of the invention. The scope of the invention is defined by the appended claims. Other aspects, advantages, and modifications are within the scope of the following claims.

What is claimed is:

1. An apparatus, comprising:
a router, which is configured with a static membership to a multicast group address, for transmitting a message reporting the static membership to another router, the message comprising an unsolicited IGMP protocol message that is transmitted when the router is booted.

2. The apparatus of claim 1, wherein the message identifies an IP multicast address for data packets.

3. The apparatus of claim 1, wherein the router configured with a static membership transmits a message reporting membership in a multicast group in response to receiving a query message for membership to a multicast group address.

4. The apparatus of claim 3, wherein the router configured with a static membership responds to queries for membership to the multicast group address that are directed to hosts connected to a local area network to which the router connects.

5. The apparatus of claim 2, wherein the router configured with a static membership has a memory storage device to encode a list of IP multicast addresses corresponding to the static memberships.

6. The apparatus of claim 3, wherein the query is a membership query message complying with IGMP protocol.

7. The apparatus of claim 3, further comprising:
a multicast DR router connected to receive the message reporting the static membership.

8. The apparatus of claim 7, wherein the DR router is configured to support the MOSPF protocol.

9. The apparatus of claim 3, further comprising:
another multicast router coupled to transmit the query message for membership to the router configured with a static membership.

10. The apparatus of claim 9, wherein the query message complies with the IGMP protocol.

11. The apparatus of claim 9, wherein each of the routers supports the MOSPF protocol.

12. The apparatus of claim 1, wherein the router configured with a static membership is selected to transmit query messages for multicast membership.

13. The apparatus of claim 12, wherein the router configured with a static membership is configured to transmit a message reporting the static membership in response to transmitting a query message.

14. The apparatus of claim 13, wherein the router configured with a static membership is configured to transmit query messages complying with the IGMP protocol.

15. The apparatus of claim 13, further comprising:
a multicast DR router connected to receive the message reporting the static membership.

16. The apparatus of claim 15, wherein the DR router is configured to support the MOSPF protocol.

17. The apparatus of claim 15, wherein the DR router and the router configured with a static group support the MOSPF protocol.

18. The apparatus of claim 3, further comprising:
a multicast DR router connected to receive the message reporting the static membership and to transmit the query message.

19. The apparatus of claim 18, wherein the multicast DR router supports the MOSPF protocol.

20. A method of propagating memberships to multicast group addresses, comprising:

transmitting a message reporting one or more static memberships to multicast group addresses from a multicast router configured with the one or more static memberships to a second multicast router, the message comprising an unsolicited IGMP message that is transmitted when the multicast router is booted.

21. The method of claim 20, further comprising:

receiving a query message for a membership to a multicast group address; and transmitting a message reporting membership in a multicast group in response to receiving the query message in the first multicast router.

22. The method of claim 20, further comprising:

transmitting a query message from the first multicast router; and transmitting a message reporting one or more static memberships in response to transmitting the query message.

23. The method of claim 20, wherein the message reporting one or more static memberships includes one or more IP multicast addresses corresponding to the one or more static memberships.

24. The method of claim 20, further comprising:

receiving the message reporting one or more static memberships in the second multicast router; and transmitting another message reporting the one or more memberships from the second multicast router to a plurality of local networks.

25. The method of claim 24, wherein transmitting another message complies with the MOSPF protocol.

26. The method of claim 24, wherein transmitting another message includes sending data on multicast memberships of hosts coupled to the first multicast router to the plurality of local networks.

27. The method of claim 24, further comprising:

receiving multicast data packets whose addresses correspond to a portion of the one or more memberships in the first multicast router in response to transmitting the one or more memberships to the plurality of networks.

28. The method of claim 24, wherein transmitting another message floods the data between DR routers.

29. The method of claim 24, wherein transmitting another message includes transmitting routing data according to a link state algorithm.

* * * * *